(12) United States Patent
Toyokura (10) Patent No.: US 11,408,726 B2
(45) Date of Patent: Aug. 9, 2022

(54) OBSERVATION METHOD AND OBSERVATION APPARATUS

(71) Applicant: KYOCERA Corporation, Kyoto (JP)

(72) Inventor: Shota Toyokura, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/273,205

(22) PCT Filed: Sep. 5, 2019

(86) PCT No.: PCT/JP2019/035001
§ 371 (c)(1),
(2) Date: Mar. 3, 2021

(87) PCT Pub. No.: WO2020/059524
PCT Pub. Date: Mar. 26, 2020

(65) Prior Publication Data
US 2021/0325170 A1      Oct. 21, 2021

(30) Foreign Application Priority Data

Sep. 19, 2018   (JP) .............................. JP2018-175163

(51) Int. Cl.
*G01B 9/02*        (2022.01)
*G01B 9/02091*     (2022.01)

(52) U.S. Cl.
CPC ..... *G01B 9/02091* (2013.01); *G01B 9/02083* (2013.01)

(58) Field of Classification Search
CPC ................ G01B 9/02091; G01B 9/02083
See application file for complete search history.

(56) References Cited

U.S. PATENT DOCUMENTS

| | | | |
|---|---|---|---|
| 10,556,365 B2 | 2/2020 | Yamada et al. | |
| 2015/0285707 A1* | 10/2015 | Jedamzik | G02B 5/08 359/848 |
| 2016/0083283 A1* | 3/2016 | Yamamoto | G01N 21/8903 348/88 |

FOREIGN PATENT DOCUMENTS

| | | | | |
|---|---|---|---|---|
| JP | 2017-170869 A | | 9/2017 | |
| WO | WO-2018159689 A1 | * | 9/2018 | ............. G01N 21/17 |

OTHER PUBLICATIONS

Natsume et al., "Estimation of lesion progress in artificial root caries by swept source optical coherence tomography in comparison to transverse microradiography", Journal of Biomedical Optics 16(7), 071408 (Jul. 2011), XP055912792A1, https://www.spiedigitallibrary.org/journals/Journal-of-Biomedical-Optics, 071408-1 to 071408-8, 9 pages.

* cited by examiner

*Primary Examiner* — Tarifur R Chowdhury
*Assistant Examiner* — Jonathon Cook
(74) *Attorney, Agent, or Firm* — Procopio Cory Hargreaves and Savitch LLP (57) ABSTRACT

In an observation method, measurement values of an object of measurement at a plurality of different positions in a plane that intersects a depth direction are acquired from an optical coherence tomography instrument (S100). In the observation method, the measurement values at a same depth position at each of the plurality of positions are averaged (S104). In the observation method, the average values at each of the depth positions are integrated in the depth direction (S105). In the observation method, a shrinkage parameter of the object of measurement is calculated on the basis of the integrated value (S106).

7 Claims, 9 Drawing Sheets

INTEGRATE

INTEGRATED VALUE

OBSERVATION METHOD AND OBSERVATION APPARATUS

CROSS-REFERENCES TO RELATED APPLICATIONS

This application claims the priority of Japanese Patent Application No. 2018-175163, filed in the Japan Patent Office on Sep. 19, 2018, which is incorporated by reference herein in its entirety.

TECHNICAL FIELD

The present disclosure relates to an observation method and an observation apparatus.

BACKGROUND

Ceramics are excellent with respect to various physical properties, such as hardness, heat resistance, corrosion resistance, and electrical insulation. Consequently, ceramic structures fabricated to function as demanded in a certain application are being used for a variety of purposes.

Ceramic structures are fabricated through steps performed on raw material, such as a mixing step, a molding step, a drying step, and a firing step (see PTL 1). A ceramic structure being fabricated shrinks during steps such as the drying step and the firing step. The structure after shrinking is ground to fit a demanded size. The structure after shrinking is hard, and grinding is time-consuming. For this reason, the size of the structure before shrinking in the molding step (hereinafter referred to as the "molded body") is determined such that the structure is as close to the demanded size as possible after shrinking.

The shrinkage during the fabrication process varies depending on factors such as the properties of the molded body. Consequently, even with the same mix, the size of the molded body to be determined varies with every batch of mixed raw material. In the molding step of the related art, an intermediate molded body is molded with a rubber press or the like, a shrinkage ratio is estimated through inspection of the intermediate molded body, the size of the molded body is determined on the basis of the shrinkage ratio, and the intermediate molded body is cut to match the size of the molded body. The inspection of the intermediate molded body takes a relatively long time. Consequently, a piece of the intermediate molded body made of raw material mixed from the same batch is extracted to inspect the intermediate molded body of the piece, and the shrinkage ratio estimated on the basis of the inspection is treated as the shrinkage ratio of the molded body from the same batch to adjust cutting conditions such as the cutting amount.

CITATION LIST

Patent Literature

PTL 1: Japanese Patent Laid-Open No. 2017-170869

SUMMARY

An observation method according to a first aspect includes:

acquiring, from an optical coherence tomography instrument, measurement values of an object of measurement at a plurality of different positions in a plane that intersects a depth direction;

calculating average values by averaging the measurement values at a same depth position at each of the plurality of positions;

calculating an integrated value by integrating, in the depth direction, the average values at each of the depth positions; and calculating a shrinkage parameter of the object of measurement on a basis of the integrated value.

Also, an observation method according to a second aspect includes:

acquiring, from an optical coherence tomography instrument, measurement values of an object of measurement at a plurality of different positions in a plane that intersects a depth direction;

calculating integrated values by integrating, in the depth direction, the measurement values at each of the plurality of positions;

calculating an average value by averaging the integrated values calculated for each of the plurality of positions; and calculating a shrinkage parameter of the object of measurement on a basis of the average value.

Also, an observation apparatus according to a third aspect includes a controller that acquires, from an optical coherence tomography instrument, measurement values of an object of measurement at a plurality of different positions in a plane that intersects a depth direction, calculates average values by averaging the measurement values at a same depth position at each of the plurality of positions, calculates an integrated value by integrating the average values at each of the depth positions, and calculates a shrinkage parameter of the object of measurement on a basis of the integrated value.

DETAILED DESCRIPTION

Hereinafter, embodiments of an observation apparatus applying the present disclosure will be described with reference to the drawings.

Figure 1:
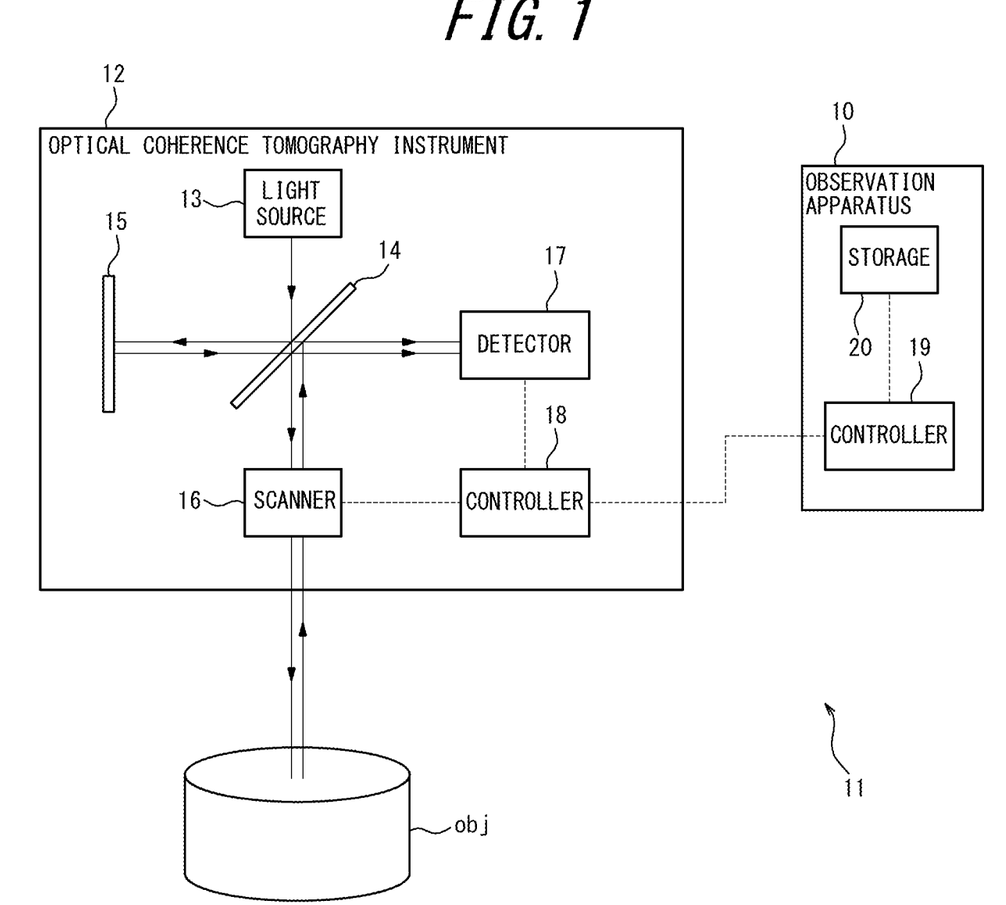
FIG. 1 is a function block diagram illustrating a schematic configuration of an observation system including an observation apparatus according to a first embodiment.

As illustrated in FIG. 1, an observation system 11 that includes an observation apparatus 10 according to a first embodiment of the present disclosure is configured to include an optical coherence tomography instrument 12 and the observation apparatus 10. The observation system 11 observes a molded body that is an intermediate body of a ceramic structure as an object of measurement obj, for example. Note that in FIG. 1, the solid lines with arrowheads joining function blocks illustrate the advancement of beams of light. Also, in FIG. 1, the dashed lines joining function blocks illustrate the flow of control signals or communicated information. The communication indicated by the dashed lines may be wired communication or wireless communication.

The optical coherence tomography instrument 12 captures images from the surface of the object of measurement obj to a maximum depth of approximately 10 mm by optical coherence tomography (OCT). In the first embodiment, the optical coherence tomography instrument 12 is a wavelength-swept OCT apparatus, but may also be another type of OCT apparatus. The optical coherence tomography instrument 12 includes a light source 13, a beam splitter 14, a reference mirror 15, a scanner 16, a detector 17, and a controller 18.

The light source 13 emits light in a band that is detectable by the detector 17, such as light in the near-infrared band for example. The light source 13 may be a wavelength-swept light source, and may repeatedly emit light of a wavelength that changes within a preset range along the time axis. Note that in the configuration in which the optical coherence tomography instrument 12 is a type of OCT apparatus other than the wavelength-swept type, the light source 13 may be a light source corresponding to that type. The light source 13 includes a collimated lens for example, and emits collimated light having a narrow diameter.

The beam splitter 14 is provided in the emission direction of the light source 13. The beam splitter 14 is a half-mirror, for example. The beam splitter 14 splits the light emitted from the light source 13, and causes the light to advance in two directions. Additionally, the beam splitter 14 causes coherent light obtained by mixing reference light incident from the reference mirror 15 with signal light incident from the object of measurement obj to advance toward the detector 17.

The reference mirror 15 is provided in one of the advancement directions of the light split by the beam splitter 14. The reference mirror 15 is disposed such that the mirror plane is perpendicular to the advancement direction, and reflects incident light toward the beam splitter 14 as reference light.

The scanner 16 scans the object of measurement obj by using the light advancing in a different direction from the reference mirror 15 out of the light split by the beam splitter 14 as irradiating light. The scanner 16 may scan by any of various methods. For example, the scanner 16 may use a reflective member such as a galvanometer mirror to scan by reflecting the irradiating light while changing the reflection direction. Additionally, the scanner 16 may also scan by using a movable stage to change the irradiated position of the irradiating light on the surface of the object of measurement obj.

Note that the object of measurement obj is disposed so as to be irradiated with the irradiating light at an angle of incidence equal to or greater than 0° in the optical coherence tomography instrument 12. The irradiating light made to irradiate various positions of the object of measurement obj by the scanner 16 advances in the depth direction from the surface while attenuating due to absorption, and is reflected and scattered at each depth position. The reflected and scattered signal light is incident on the beam splitter 14.

The detector 17 receives the coherent light advancing from the beam splitter 14. The detector 17 outputs a measurement signal having an intensity corresponding to the amount of received light.

The controller 18 includes one or more processors and memory. The processor(s) may include a general-purpose processor that executes specific functions by loading specific programs, and a special-purpose processor dedicated to a specific process. The special-purpose processor may include an application specific integrated circuit (ASIC). The processor(s) may also include a programmable logic device (PLD). The PLD may include a field-programmable gate array (FPGA). The controller 18 may also be a system-on-a-chip (SoC) or a system in a package (SiP) in which one or a plurality of processors cooperate.

Figure 2:
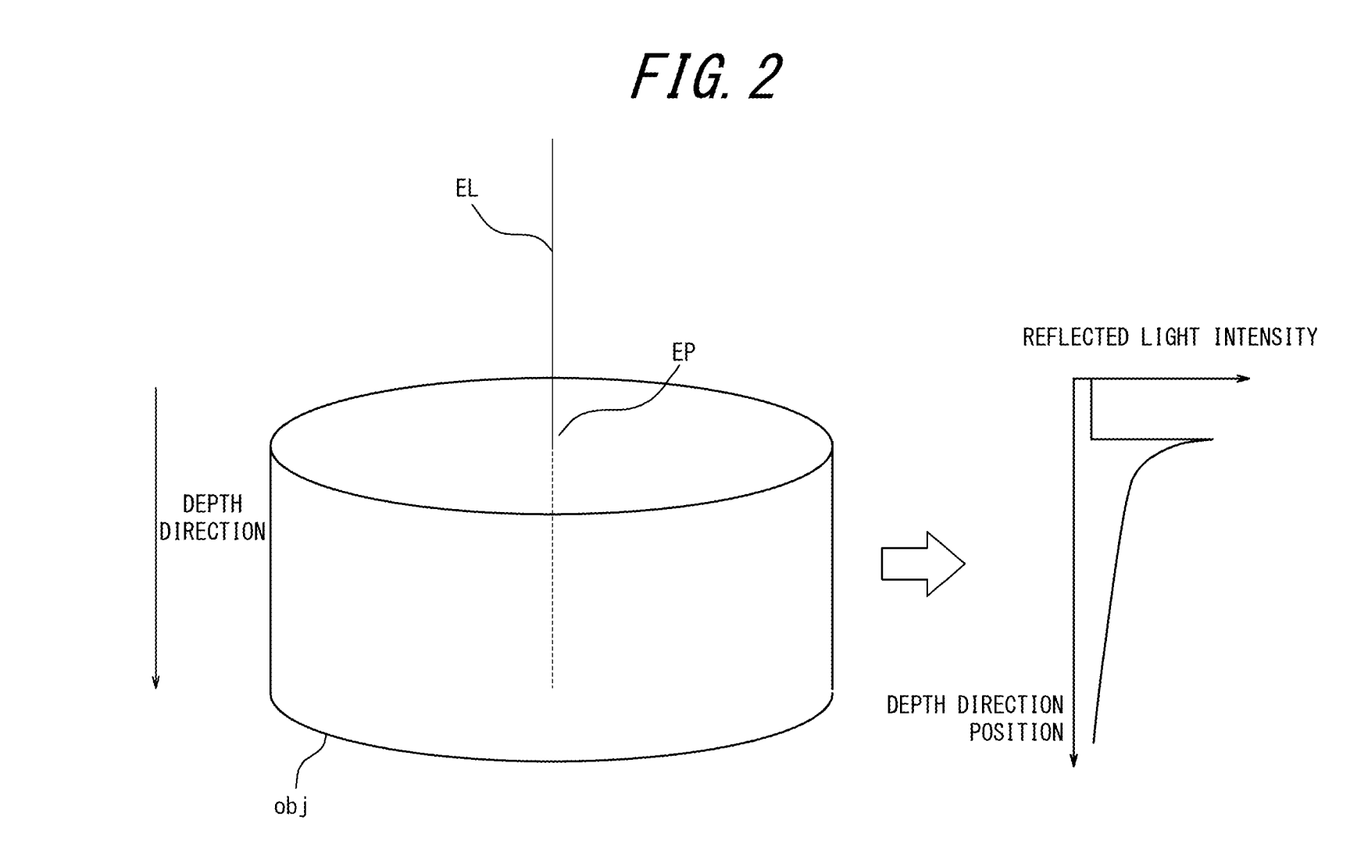
FIG. 2 is a diagram illustrating the relationship between a measurement value and a depth direction calculated by a controller of the optical coherence tomography instrument in FIG. 1.

The controller 18 calculates the reflected light intensity in the depth direction at any irradiated position EP of the irradiating light EL as illustrated in FIG. 2 by performing an inverse Fourier transform on the measurement signal acquired from the detector 17 as a measurement value. The controller 18 recognizes the irradiated position EP in a plane intersecting the depth direction overlapping the radiation direction of the irradiating light EL by acquiring position information from the scanner 16. The controller 18 outputs the irradiated position EP and the reflected light intensity along the depth direction to the observation apparatus 10 in association with each other.

The observation apparatus 10 includes a controller 19 and storage 20.

The controller 19 includes one or more processors and memory. The processor(s) may include a general-purpose processor that executes specific functions by loading specific programs, and a special-purpose processor dedicated to a specific process. The special-purpose processor may include an application specific integrated circuit (ASIC). The processor(s) may also include a programmable logic device (PLD). The PLD may include an FPGA. The controller 19 may also be a SoC or a SiP in which one or a plurality of processors cooperate.

Figure 3:
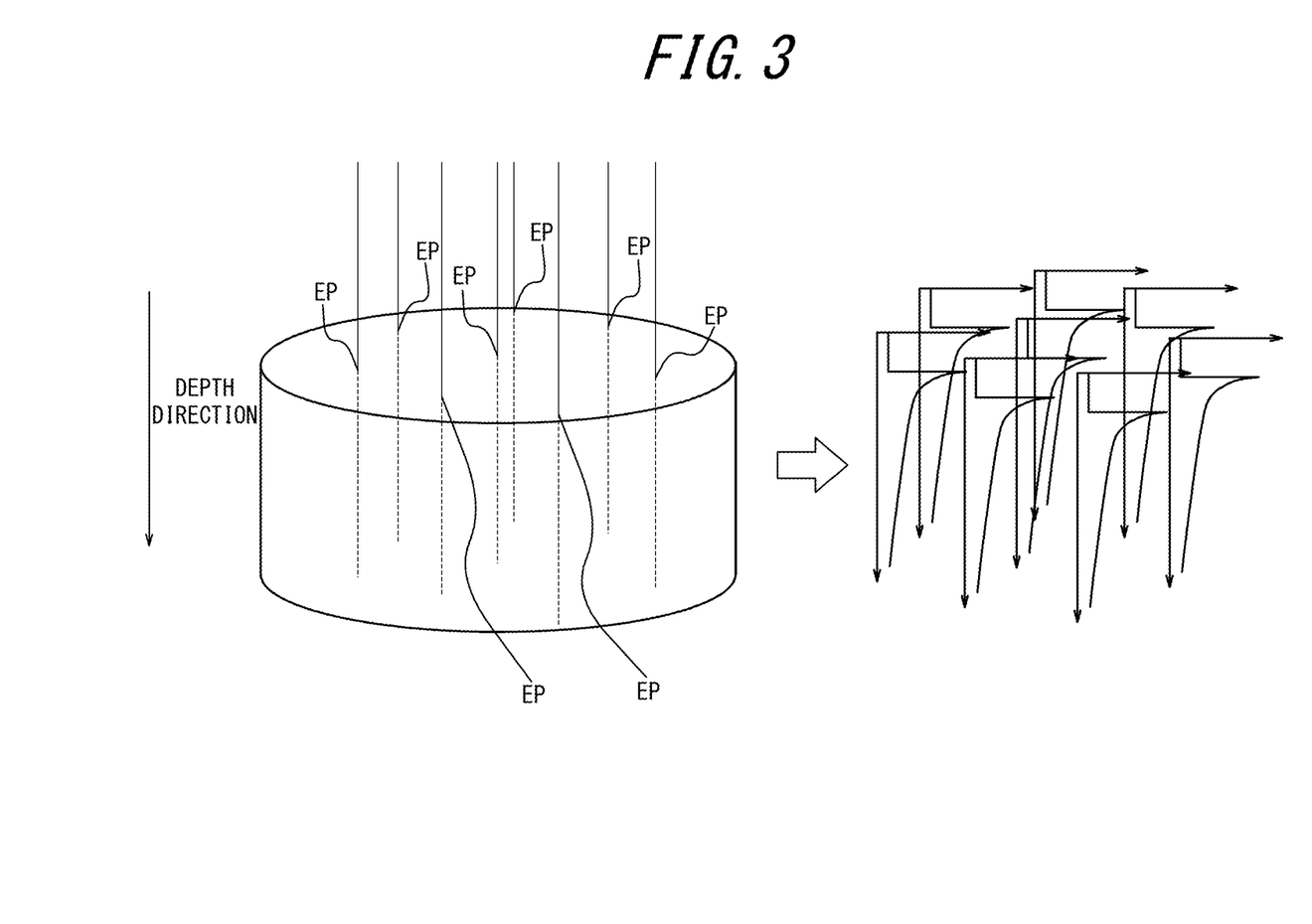
FIG. 3 is a diagram for explaining measurement values calculated at a plurality of positions by the optical coherence tomography instrument in FIG. 1.

As illustrated in FIG. 3, the controller 19 acquires a plurality of different positions in the plane intersecting the depth direction from the optical coherence tomography instrument 12, or in other words, measurement values of the object of measurement obj at a plurality of irradiated positions EP. Note that in the first embodiment, a measurement value of the object of measurement obj is the reflected light intensity along the depth direction, as described above. The controller 19 may cause the storage 20 to store the acquired measurement values along the depth direction at each of the plurality of positions.

Figure 4:
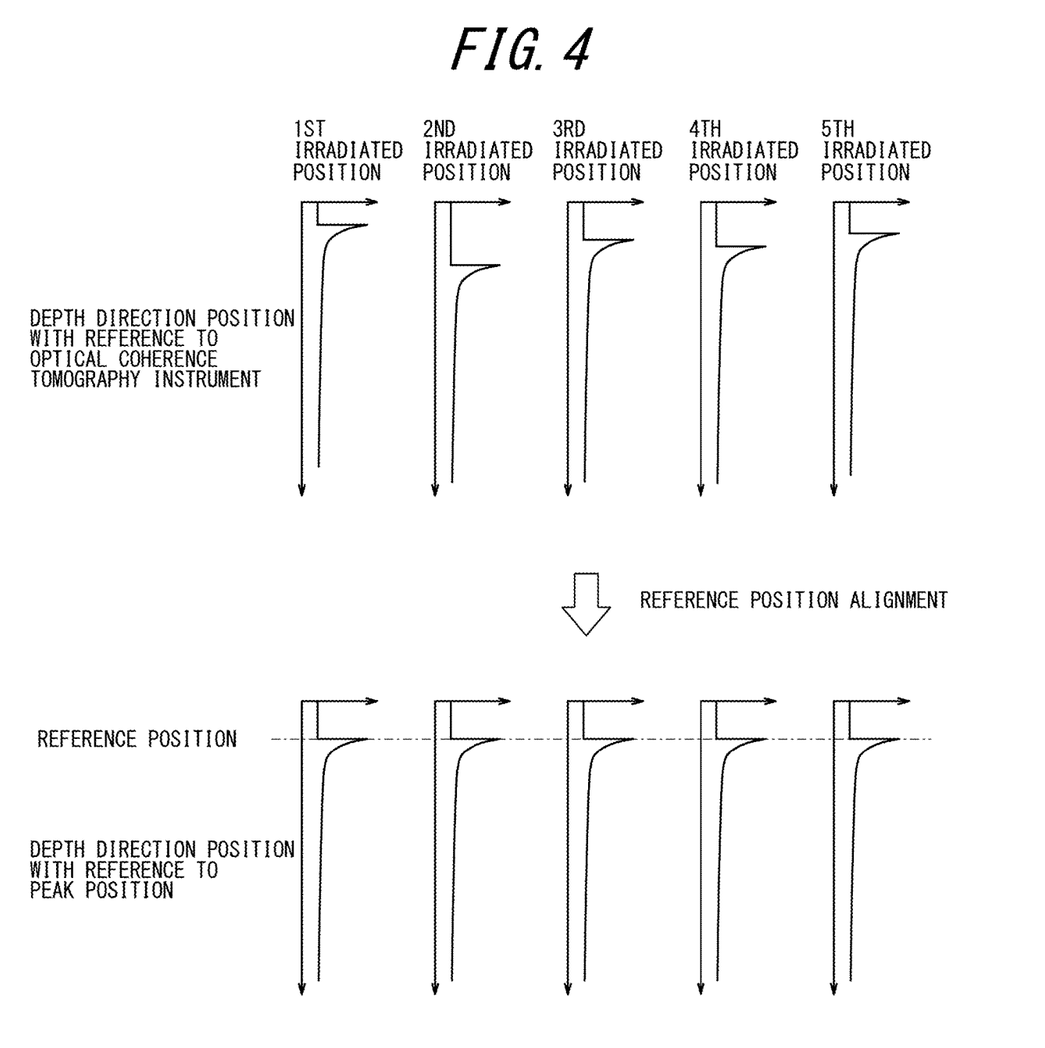
FIG. 4 is a diagram for explaining how the controller of the observation apparatus in FIG. 1 aligns the depth positions that act as the peaks of the measurement values to a reference position.

The controller 19 may detect the position in the depth direction where a peak occurs in the measurement value of the object of measurement obj at each of the plurality of positions as a peak position. As illustrated in FIG. 4, the controller 19 may align a reference position in the depth direction of the measurement values of the object of measurement obj at each of the plurality of positions (for example, from a first irradiated position to a fifth irradiated position) to the detected peak position.

Figure 5:
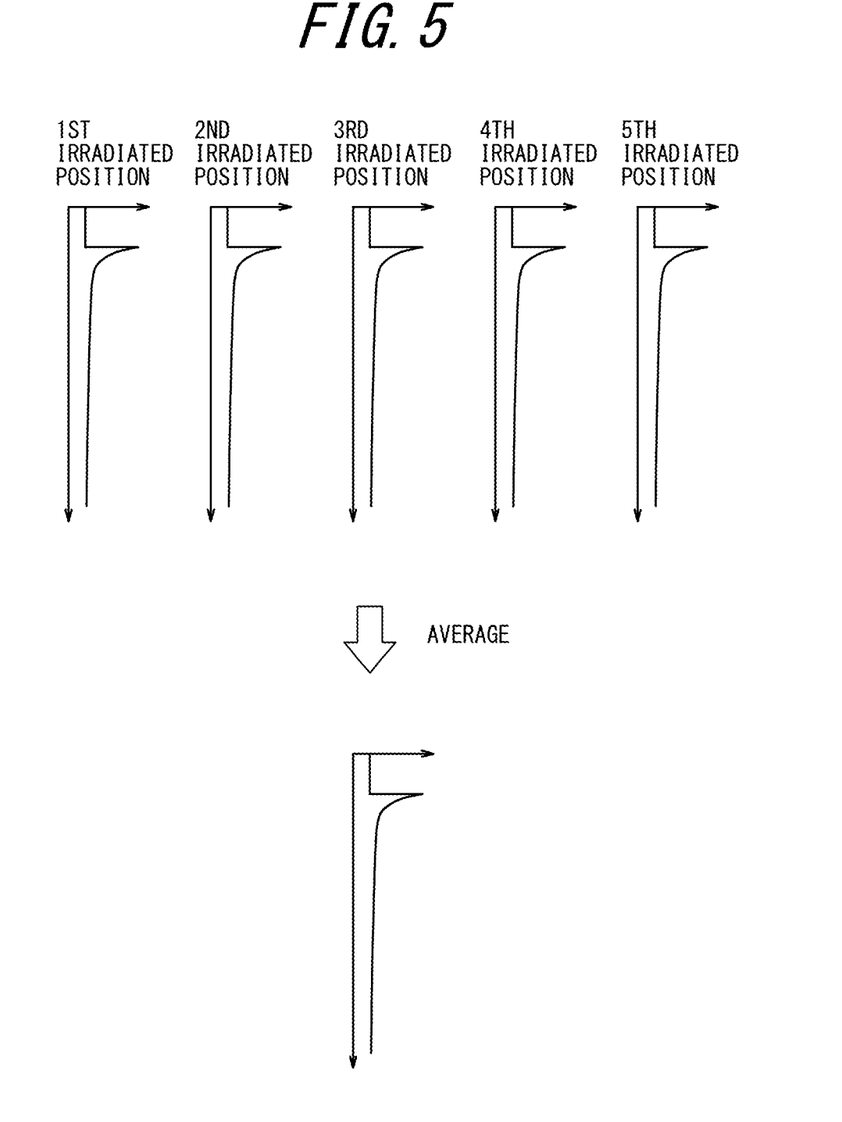
FIG. 5 is a diagram for explaining how the controller of the observation apparatus in FIG. 1 averages the measurement values detected at a plurality of positions respectively for the same depth position.

As illustrated in FIG. 5, the controller 19 calculates an average value by averaging the measurement values at the same depth position at each of the plurality of positions. In a configuration that aligns a reference position in the depth direction to the detected peak position as described above, the controller 19 may average the measurement values at the same depth position with reference to the peak position at each of the plurality of positions.

Figure 6:
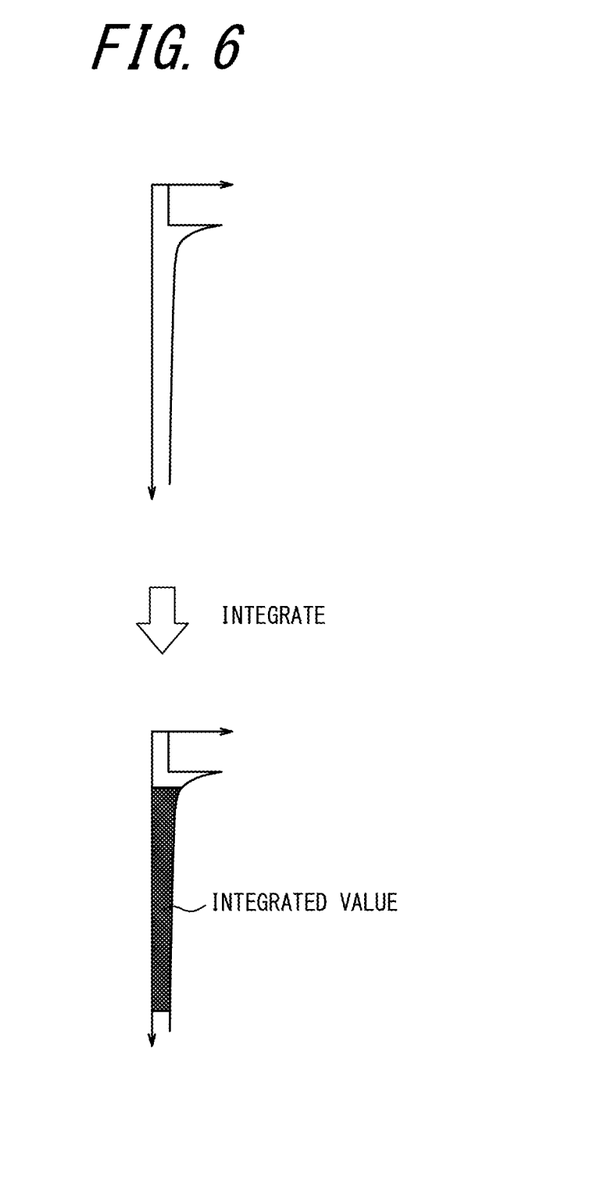
FIG. 6 is a diagram for explaining how the controller of the observation apparatus in FIG. 1 calculates an integrated value from the average value of the measurement values at the same depth position.

As illustrated in FIG. 6, the controller 19 integrates the averaged measurement values in the depth direction to calculate an integrated value. Note that when calculating the integrated value, the controller 19 may integrate the measurement values included within a range of a predetermined depth position. The predetermined depth position may be a depth position in a coordinate system that takes a reference point in the optical coherence tomography instrument 12 as the origin, or a depth position based on the peak position in the depth direction.

Figure 7:
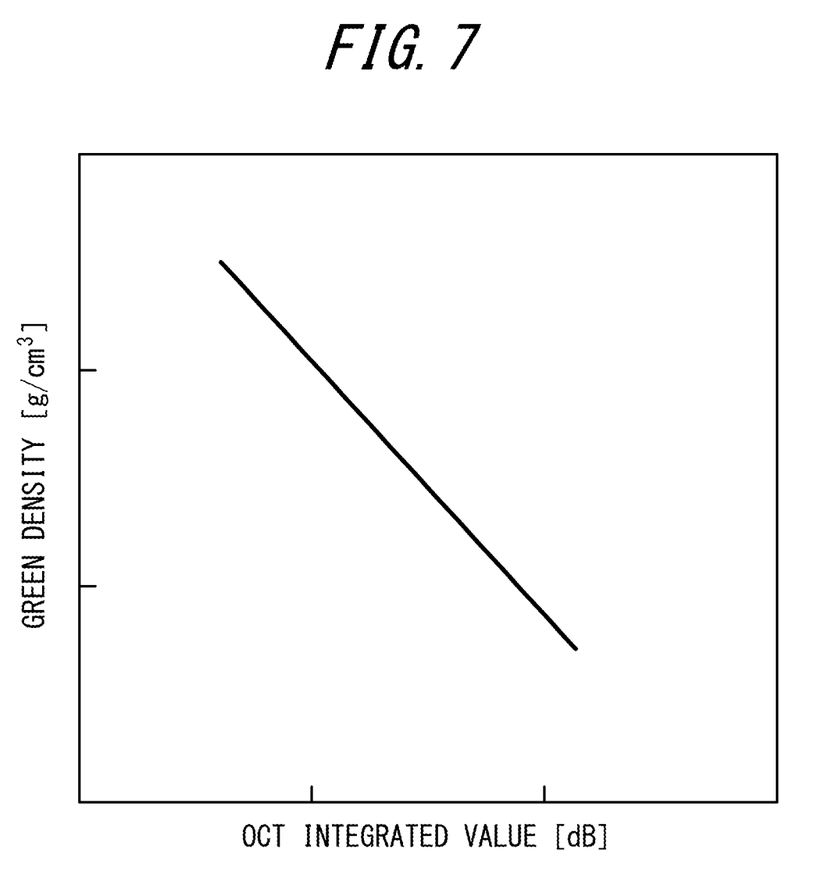
FIG. 7 is a graph for explaining a calibration curve illustrating a correspondence relationship between the integration value of the measurement values and the green density.

On the basis of the integrated value, the controller 19 calculates a shrinkage parameter of the object of measurement obj. Note that the shrinkage parameter is any variable expressing the internal state of the molded piece treated as the object of measurement obj, which influences the degree of shrinkage when drying and firing the object of measurement obj. The shrinkage parameter is a parameter such as the green density or the porosity of the molded piece, for example. The integrated value is correlated with a shrinkage parameter such as the green density, which may vary depending on the roughness or fineness of the molded piece. Accordingly, the controller 19 may calculate the shrinkage parameter by converting from the integrated value using a calibration curve of the shrinkage parameter with respect to the integrated value, like the one illustrated in FIG. 7 as an example.

The controller 19 reports the calculated shrinkage parameter to a ceramic structure fabrication apparatus. On the basis of the reported shrinkage parameter, the fabrication apparatus determines cutting conditions for the object of measurement obj for which the shrinkage parameter was calculated. The fabrication apparatus cuts the object of measurement obj under the determined cutting conditions, and fabricates the ceramic structure by going through a drying step and a firing step. Note that the controller 19 may also calculate the cutting conditions on the basis of the shrinkage parameter. In a configuration in which the controller 19 calculates the cutting conditions, the controller 19 controls the fabrication apparatus to cut the object of measurement obj according to the calculated cutting conditions.

The storage 20 includes storage devices of any type, such as random access memory (RAM) and read only memory (ROM), for example. The storage 20 stores various programs causing the controller 19 to function, as well as various information used by the controller 19.

The storage 20 stores the reflected light intensity along the depth direction at each of a plurality of positions for each object of measurement obj, for example. Additionally, the storage 20 stores a calibration curve of the shrinkage parameter with respect to the integrated value, for example. Additionally, the storage 20 stores the shrinkage parameter calculated for each object of measurement obj, for example.

Figure 8:
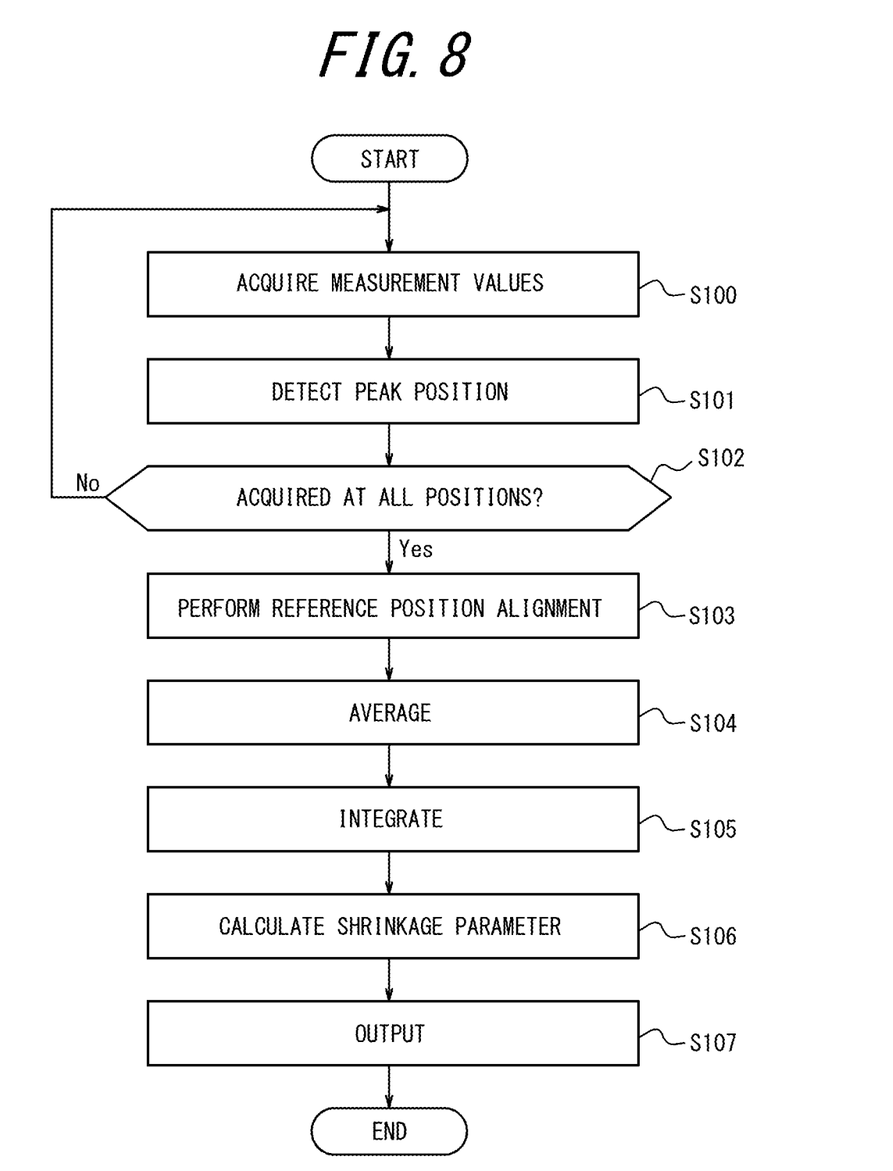
FIG. 8 is a flowchart for explaining a shrinkage parameter output process executed by the controller of the observation apparatus in FIG. 1 in the first embodiment.

Next, the shrinkage parameter output process executed by the controller 19 in the first embodiment will be described using the flowchart in FIG. 8. The shrinkage parameter output process starts together when the optical coherence tomography instrument 12 starts measuring the measurement values of any object of measurement obj. Note that the start of the measurement by the optical coherence tomography instrument 12 may be recognized by the controller 19 through a synchronization signal acquired from the optical coherence tomography instrument 12, for example.

In step S100, the controller 19 acquires the measurement value of the object of measurement obj, or in other words the reflected light intensity along the depth direction, at any irradiated position EP. After the acquisition, the process proceeds to step S101.

In step S101, the controller 19 detects the position in the depth direction where a peak occurs in the measurement value acquired in step S100 as a peak position. After the detection of the peak position, the process proceeds to step S102.

In step S102, the controller 19 determines whether or not a measurement value has been acquired at all positions where the object of measurement obj is to be measured. Note that the controller 19 may determine whether or not a measurement value has been acquired at all positions on the basis of the synchronization signal acquired from the optical coherence tomography instrument 12, notification information indicating completion, or the like. In the case where a measurement value has not been acquired at all positions, the process returns to step S100. In the case where a measurement value has been acquired at all positions, the process proceeds to step S103.

In step S103, the controller 19 aligns a reference position in the depth direction of the measurement values at each of the plurality of positions to the peak position detected in step S101. After the reference positioning, the process proceeds to step S104.

In step S104, the controller 19 averages the measurement values at each of the plurality of positions aligned to a reference position in step S103 to calculate an average value respectively for the same depth position. After the calculation of the average value, the process proceeds to step S105.

In step S105, the controller 19 integrates the measurement values averaged in step S104 within a range of a predetermined depth position to calculate an integrated value. After the calculation of the integrated value, the process proceeds to step S106.

In step S106, the controller 19 calculates a shrinkage parameter on the basis of the integrated value calculated in step S105. After the calculation of the shrinkage parameter, the process proceeds to step S107.

In step S107, the controller 19 outputs the shrinkage parameter calculated in step S106 to the fabrication apparatus. After the output of the shrinkage parameter, the shrinkage parameter output process ends.

In the observation apparatus 10 according to the first embodiment having a configuration like the above, measurement values of the object of measurement obj measured at a plurality of positions by the optical coherence tomography instrument 12 are used. Consequently, because the observation apparatus 10 uses a measurement result from the optical coherence tomography instrument 12 which is capable of fast and non-invasive imaging, the observation apparatus 10 is capable of fast observation of each object of measurement obj that is ultimately processed into a finished product.

Also, the observation apparatus 10 according to the first embodiment averages the measurement values at each of a plurality of positions. Consequently, the observation apparatus 10 may be made to calculate a shrinkage parameter used to infer the shrinkage of the object of measurement obj as a whole while reducing variations in the measurement values due to the plurality of positions.

Also, the observation apparatus 10 according to the first embodiment averages the measurement values at the same depth positions. The irradiating light from the optical coherence tomography instrument 12 attenuates greatly as the irradiating light advances farther in the depth direction of the object of measurement obj. Therefore, even if the internal state of the object of measurement obj is uniform in the depth direction, measurement values at different depths are typically different values. With respect to such a phenomenon, the observation apparatus 10 having the configuration described above averages the measurement values at the same depth positions which have approximately the same degree of attenuation, and therefore may remove the influence of attenuation-induced variations from the average value.

Also, the observation apparatus 10 according to the first embodiment integrates the respective average values of the depth positions in the depth direction, and calculates a shrinkage parameter of the object of measurement obj as a whole on the basis of the integrated value. Consequently, the observation apparatus 10 may detect a parameter that influences shrinkage in steps such as the drying step and the firing step.

Also, the observation apparatus 10 according to the first embodiment performs the averaging with respect to the measurement values at the same depth position with reference to the peak position. In the optical coherence tomography instrument 12, the surface of the object of measurement is inclined with respect to the advancement direction of the irradiating light, or in other words the depth direction, to reduce the detection of strong back-reflections from the surface of the object of measurement. As described above, the irradiating light EL that irradiates the object of measurement obj attenuates greatly as the irradiating light EL advances in the depth direction from the surface, and consequently, the intensity of the measurement values also drops as the depth position from the surface becomes longer. With respect to such a phenomenon, the observation apparatus 10 having the configuration described above averages the measurement values at the same depth positions with reference to the peak position estimated as the surface position, and therefore may remove the influence of attenuation-induced variations from the average value, even with a configuration in which the object of measurement obj is inclined with respect to the depth direction.

Also, the observation apparatus 10 according to the first embodiment integrates the measurement values within a range of a predetermined depth position. With the resolving power of an optical coherence tomography instrument, the surface of the object of measurement obj may be detected with one or two pixels, or in other words at one or two depth positions, respectively. A measurement value obtained by detecting the surface of the object of measurement obj with one pixel is greatly different in intensity from a measurement value detecting with two pixels. Therefore, an average value of the measurement values at a depth position corresponding to the surface where the intensity is particularly strong has relatively low reliability as a measurement value. On the other hand, the observation apparatus 10 having the configuration described above may integrate the average values of the measurement values within a range that excludes the depth position corresponding to the surface, and therefore may improve the estimation accuracy for the shrinkage of the object of measurement obj based on the shrinkage parameter.

Also, in the observation apparatus 10 according to the first embodiment, the integrated value is converted to a shrinkage parameter by using a calibration curve. Consequently, the observation apparatus 10 may reduce the processing load on the controller 19.

Next, an observation apparatus according to a second embodiment of the present disclosure will be described. In the second embodiment, the order of processes performed by the controller of the observation apparatus is different from the first embodiment. Hereinafter, the second embodiment will be described with focus on the points that differ from the first embodiment. Note that members having the same configuration as the first embodiment are denoted with the same signs.

As illustrated in FIG. 1, the observation apparatus 10 according to the second embodiment includes a controller 19 and a storage 20 like the first embodiment. Note that in the second embodiment, the configuration and function of the optical coherence tomography instrument 12 are the same as the optical coherence tomography instrument 12 according to the first embodiment.

In the second embodiment, like the first embodiment, the controller 19 of the observation apparatus 10 acquires measurement values of an object of measurement obj at a plurality of irradiated position EP. In the second embodiment, like the first embodiment, the controller 19 may detect the position in the depth direction where a peak occurs in the measurement value of the object of measurement obj at each of the plurality of positions as a peak position. Also, in the second embodiment, like the first embodiment, the controller 19 may align a reference position in the depth direction of the measurement values of the object of measurement obj at each of the plurality of positions to the detected peak position.

In the second embodiment, unlike the first embodiment, before averaging, the controller 19 integrates, in the depth direction, the measurement values at each of a plurality of positions to calculate an integrated value for each of the plurality of positions. Note that in the second embodiment, the controller 19 may integrate the measurement values included within a range of a predetermined depth position when calculating the integrated values, like the first embodiment. The predetermined depth position in the second embodiment may be the same as the first embodiment.

In the second embodiment, unlike the first embodiment, the controller 19 averages the integrated values calculated for each of the plurality of positions to calculate an average value. In the second embodiment, unlike the first embodiment, the controller 19 calculates a shrinkage parameter of the object of measurement obj on the basis of the calculated average value. In the second embodiment, like the first embodiment, the controller 19 may report the calculated shrinkage parameter to a fabrication apparatus, or calculate cutting conditions on the basis of the calculated shrinkage parameter to control the fabrication apparatus.

Figure 9:
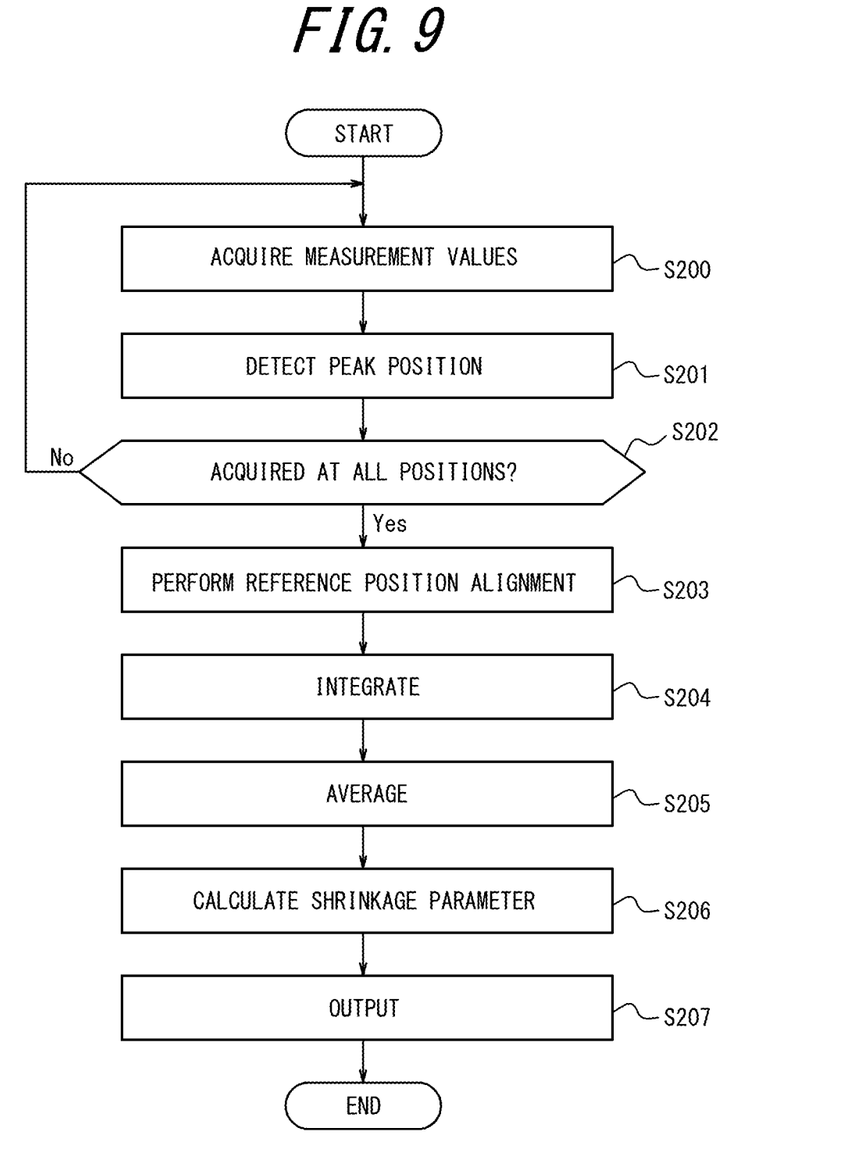
FIG. 9 is a flowchart for explaining a shrinkage parameter output process executed by the controller of an observation apparatus in a second embodiment.

Next, the shrinkage parameter output process executed by the controller 19 in the second embodiment will be described using the flowchart in FIG. 9. In the second embodiment, like the first embodiment, the shrinkage parameter output process starts together when the optical coherence tomography instrument 12 starts measuring the measurement values of the any object of measurement obj.

In steps S200 to S203, the controller 19 performs the same operations as in steps S100 to S103 of the shrinkage parameter output process of the first embodiment. In step S204, the controller 19 integrates the measurement values at each of the plurality of positions aligned to a reference position in step S203 within a range of a predetermined depth position to calculate integrated values. After the calculation of the integrated values, the process proceeds to step S205.

In step S205, the controller 19 averages the integrated values calculated for each of the plurality of positions in step S204 to calculate an average value. After the calculation of the average value, the process proceeds to step S206.

In step S206, the controller 19 calculates a shrinkage parameter on the basis of the average value calculated in step S205. After the calculation of the shrinkage parameter, the process proceeds to step S207.

In step S207, the controller 19 outputs the shrinkage parameter calculated in step S206 to the fabrication apparatus. After the output of the shrinkage parameter, the shrinkage parameter output process ends.

In the observation apparatus 10 according to the second embodiment having a configuration like the above, like the first embodiment, measurement values of the object of measurement obj measured at a plurality of positions by the optical coherence tomography instrument 12 are used. Consequently, the observation apparatus 10 is capable of fast observation of each object of measurement obj that is ultimately processed into a finished product.

Also, the observation apparatus 10 according to the second embodiment integrates, in the depth direction, the measurement values at each of a plurality of positions, and ultimately calculates a shrinkage parameter of the object of measurement obj as a whole on the basis of the integrated values. Consequently, the observation apparatus 10 according to the second embodiment may detect a parameter that influences shrinkage in steps such as the drying step and the firing step.

Also, the observation apparatus 10 according to the second embodiment averages the integrated values at each of a plurality of positions. Consequently, the observation apparatus 10 according to the second embodiment may be made to calculate a shrinkage parameter used to infer the shrinkage of the object of measurement obj as a whole while reducing variations in the integrated values due to the plurality of positions.

The present disclosure has been described on the basis of the accompanying drawings and examples, but it should be noted that various modifications and alterations may be performed easily by persons skilled in the art on the basis of the present disclosure. Consequently, it should be noted that these modifications and alterations are included in the scope of the present disclosure.

Although the foregoing discloses a system described as including various modules and/or units that execute specific functions, it should be noted that these modules and units are illustrated schematically to briefly describe their functionality, and do not necessarily indicate specific hardware and/or software. In this sense, it is sufficient for these modules, units, and other structural elements to be hardware and/or software implemented to substantially execute the specific functions described herein. The various functions of different structural elements may be combined or separated into hardware and/or software in any way, and each can be used individually or in some combination with each other. Furthermore, devices such as a keyboard, display, touchscreen, and pointing device are included, but inputs/outputs, I/O devices, or a user interface not limited to the above can be connected to the system, either directly or via an intervening I/O controller. In this way, various aspects of the content disclosed herein can be carried out in many different modes, and these modes are all included in the scope of the content disclosed herein.

REFERENCE SIGNS LIST 10 observation apparatus
11 observation system
12 optical coherence tomography instrument
13 light source
14 beam splitter
15 reference mirror
16 scanner
17 detector
18 controller
19 controller
20 storage
EL irradiating light
EP irradiated position
obj object of measurement

The invention claimed is:

1. An observation method comprising:
    irradiating a light beam to a first point of a green compact;
    irradiating the light beam to a second point of the green compact;
    separating a first coherent light from reflected light at the first point using a beam splitter;
    separating a second coherent light from the reflected light at the second point using the beam splitter;
    measuring a first intensity of the first coherent light;
    measuring a second intensity of the second coherent light;
    calculating a first average value of the first intensity and the second intensity at a first depth and calculating a second average value of the first intensity and the second intensity at a second depth;
    calculating an integrated value by integrating the first average value and the second average value; and
    calculating a shrinkage parameter, comprising at least one of green density or porosity of the green compact, based on the integrated value.

2. The observation method according to claim 1, further comprising:
    detecting a peak position in a depth direction of the first intensity and the second intensity,
    wherein the calculating of the first average value at the first depth and the calculating of the second average value at the second depth are with reference to the peak positions at the first point and the second point.

3. The observation method according to claim 1, wherein the first depth and the second depth are included within a range of a predetermined depth position.

4. The observation method according to claim 1, wherein the shrinkage parameter is converted from the integrated value using a calibration curve.

5. An observation method comprising:
    irradiating a light beam to a first point of a green compact;
    irradiating the light beam to a second point of the green compact;
    separating a first coherent light from reflected light at the first point using a beam splitter;
    separating a second coherent light from the reflected light at the second point using the beam splitter;
    measuring a first intensity of the first coherent light;
    measuring a second intensity of the second coherent light;
    calculating a first integrated value of the first intensity at a first depth and a second depth and calculating a second integrated value of the second intensity at the first depth and the second depth;
calculating an average value by averaging the first integrated value and the second integrated value; and
calculating a shrinkage parameter, comprising at least one of green density or porosity of the green compact, based on the average value.

6. An observation apparatus comprising:
a controller that
irradiates a light beam to a first point of a green compact,
irradiates the light beam to a second point of the green compact,
separates a first coherent light from reflected light at the first point using a beam splitter,
separates a second coherent light from the reflected light at the second point using the beam splitter,
measures a first intensity of the first coherent light,
measures a second intensity of the second coherent light,
calculates a first average value of the first intensity and the second intensity at a first depth and calculates a second average value of the first intensity and the second intensity at the second depth,
calculates an integrated value by integrating the first average value and the second average value, and
calculates a shrinkage parameter, comprising at least one of green density or porosity of the green compact, based on the integrated value.

7. An observation apparatus comprising:
a light source;
a light splitter;
a detector; and
a controller communicatively connected to the light source, the light splitter, and the detector, the controller configured to
cause the light source to emit a light beam to irradiate a first point of a green compact,
cause the light source to emit a light beam to irradiate a second point of the green compact,
cause the light splitter to separate first coherent light from reflected light,
cause the light splitter to separate second coherent light from reflected light,
cause the detector to measure intensities of the first coherent light in a depth direction,
cause the detector to measure intensities of the second coherent light in a depth direction,
calculate a first average value at a first depth,
calculate a second average value at a second depth,
calculate an integrated value by integrating the first average value and the second average value, and
calculate a shrinkage parameter, comprising at least one of green density or porosity of the green compact, based on the integrated value.

* * * * *